United States Patent
Ingemi et al.

(10) Patent No.: US 12,206,281 B2
(45) Date of Patent: Jan. 21, 2025

(54) HIGH-EFFICIENCY MODULAR UNINTERRUPTIBLE POWER SUPPLY

(71) Applicant: SCHNEIDER ELECTRIC IT CORPORATION, Foxboro, MA (US)

(72) Inventors: Michael J. Ingemi, Norwood, MA (US); Luka Petrovic, North Billerica, MA (US)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 173 days.

(21) Appl. No.: 17/660,274

(22) Filed: Apr. 22, 2022

(65) Prior Publication Data

US 2022/0247207 A1 Aug. 4, 2022

Related U.S. Application Data

(63) Continuation of application No. 17/115,117, filed on Dec. 8, 2020, now Pat. No. 11,355,956.

(51) Int. Cl.
*H02J 9/06* (2006.01)
*H02J 1/10* (2006.01)

(52) U.S. Cl.
CPC ............ *H02J 9/061* (2013.01); *H02J 1/102* (2013.01); *H02J 9/068* (2020.01)

(58) Field of Classification Search
CPC .. H02J 9/061; H02J 1/102; H02J 9/068; H02J 9/062; H02J 9/06
See application file for complete search history.

(56) References Cited

U.S. PATENT DOCUMENTS

| 5,982,652 A | 11/1999 | Simonelli et al. |
| 10,375,850 B2 | 8/2019 | Klikic et al. |

(Continued)

FOREIGN PATENT DOCUMENTS

| CN | 104731294 A | 6/2015 |
| CN | 107836068 A | 3/2018 |

(Continued)

OTHER PUBLICATIONS

APC by Schneider Electric, Electrical Review, Efficiency booster mode UPS, STX40 Portable fault location system, Megger, May 11, 2021, 2 pages.

(Continued)

*Primary Examiner* — Rexford N Barnie
*Assistant Examiner* — Rasem Mourad
(74) *Attorney, Agent, or Firm* — Lando & Anastasi, LLP

(57) ABSTRACT

Examples of the disclosure include a power system comprising an input to receive input power, an output to provide power to a load, a sensor configured to provide load information indicative of power drawn by the load, a plurality of power modules, each having a power module input configured to be coupled to the input, and a power module output configured to be coupled to the output, and a controller coupled to the power modules and the sensor, and being configured to control the power modules to provide power to the output, receive the load information from the sensor, select, based on the load information, at least one power module to maintain in an active state to provide power to the output, and deactivate each power module other than the at least one power module based on selecting the at least one power module to maintain in the active state.

19 Claims, 4 Drawing Sheets

(56) References Cited

U.S. PATENT DOCUMENTS

| | | | |
|---|---|---|---|
| 2007/0216229 A1* | 9/2007 | Johnson | G06F 11/2015 |
| | | | 714/E11.083 |
| 2009/0254768 A1 | 10/2009 | Livescu et al. | |
| 2012/0026764 A1* | 2/2012 | Giuntini | H02J 9/005 |
| | | | 363/69 |
| 2014/0054967 A1 | 2/2014 | Toyoda | |
| 2014/0210271 A1* | 7/2014 | Toyoda | H02J 9/061 |
| | | | 307/66 |
| 2015/0207362 A1 | 7/2015 | Ohnishi et al. | |
| 2015/0305197 A1 | 10/2015 | King et al. | |
| 2016/0322862 A1* | 11/2016 | Boratyn | G06F 1/3234 |
| 2018/0152046 A1* | 5/2018 | Toyoda | H02J 9/062 |

FOREIGN PATENT DOCUMENTS

| | | |
|---|---|---|
| EP | 3324513 A1 | 5/2018 |
| JP | 2008228517 A | 9/2008 |
| WO | 2014201309 A1 | 12/2014 |
| WO | 2018234046 A1 | 12/2018 |

OTHER PUBLICATIONS

Manual, Huawei, "Modular UPS is ready, SmartLi is on, Modular UPS, Pod and Lithium Battery Solution".
Extended European Search Report from corresponding European Application No. 21212827.6 dated Apr. 19, 2022.

\* cited by examiner

HIGH-EFFICIENCY MODULAR UNINTERRUPTIBLE POWER SUPPLY

CROSS-REFERENCE TO RELATED APPLICATIONS

This application claims priority under 35 U.S.C. § 120 as a continuation of U.S. application Ser. No. 17/115,117, titled "HIGH-EFFICIENCY MODULAR UNINTERRUPTIBLE POWER SUPPLY," filed on Dec. 8, 2020, which is hereby incorporated by reference in its entirety.

BACKGROUND

1. Field of the Disclosure

At least one example in accordance with the present disclosure relates generally to increasing an efficiency of a power device.

2. Discussion of Related Art

The use of power devices, such as Uninterruptible Power Supplies (UPSs), to provide regulated, uninterrupted power for sensitive and/or critical loads, such as computer systems and other data processing systems, is known. Certain UPSs may be "modular," in that power modules may be added to or removed from the UPS to increase or decrease a maximum power output of the UPS, respectively.

SUMMARY

According to at least one aspect of the present disclosure, a power system is provided comprising an input to receive input power, an output to provide output power to a load, a sensor configured to provide load information indicative of power drawn by the load, a plurality of power modules, each power module of the plurality of power modules having a power module input configured to be coupled to the input, and a power module output configured to be coupled to the output, and a system controller coupled to the plurality of power modules and to the sensor, the system controller being configured to control the plurality of power modules to provide power to the output, receive the load information from the sensor, select, based on the load information, at least one power module of the plurality of power modules to maintain in an active state to provide power to the output, and deactivate each power module of the plurality of power modules other than the at least one power module based on selecting the at least one power module to maintain in the active state.

In various examples, each power module of the plurality of power modules includes a module sensor configured to determine module load information indicative of power provided at a respective power module output, and a module controller configured to receive the module load information from the module sensor. In some examples, each activated module controller is configured to detect, based on the module load information, an overload condition, and provide an activation signal to at least one other power module of the plurality of power modules based on detecting the overload condition. In at least one example, each activated module controller is communicatively coupled to the system controller and is configured to receive, from the system controller, a deactivation signal or an activation signal, control the respective power module to continue providing module output power responsive to receiving the activation signal, and control the respective power module to deactivate and discontinue providing module output power responsive to receiving the deactivation signal.

In various examples, the system controller is configured to select a first group of one or more power modules to maintain in an active state responsive to the overload condition, provide the activation signal to each power module in the first group of one or more power modules, select a second group of one or more power modules to deactivate responsive to the overload condition, and provide the deactivation signal to each power module in the second group of one or more power modules. In some examples, selecting the first group of one or more power modules to maintain in the active state includes identifying a most efficient group of one or more power modules to satisfy the overload condition. In at least one example, the system controller is configured to detect, based on the load information, an overload condition, activate each deactivated power module of the plurality of power modules to provide module output power based on detecting the overload condition.

In various examples, the system controller is configured to select a first group of one or more power modules to maintain in an active state responsive to the overload condition, provide the activation signal to each power module in the first group of one or more power modules, select a second group of one or more power modules to deactivate responsive to the overload condition, and provide the deactivation signal to each power module in the second group of one or more power modules. In some examples, selecting the first group of one or more power modules to maintain in the active state includes identifying a most efficient group of one or more power modules to satisfy the overload condition. In at least one example, deactivating each power module includes sending a deactivation signal to each power module.

In various examples, each power module includes a respective switch configured to control output electrical power, and each power module is configured to deactivate the switch responsive to receiving the deactivation signal. In some examples, each power module includes an inverter including the respective switch. In at least one example, each power module includes a power bus coupled to the inverter, and each power module is configured to maintain the power bus at an active operating voltage level while deactivated.

According to at least one example of the disclosure, a power module in a power system providing power to a load is provided, the power module comprising a module input configured to receive input power, a module output configured to provide output power to the load, at least one module sensor configured to provide load information indicative of the output power provided at the module output, and a module controller coupled to the at least one module sensor and configured to receive the load information from the at least one module sensor, determine, based on the load information, that an overload condition exists, provide, responsive to determining that the overload condition exists, an activation signal to at least one other power module instructing the at least one other power module to provide output power to the load, determine that the power module is to be deactivated, and deactivate the power module to discontinue providing the output power to the module output.

In various examples, determining that the overload condition includes determining, based on the load information, that a power rating of the load exceeds a power level of power provided to the load. In some examples, the module controller is further configured to receive an activation signal from the at least one other power module, and transition from deactive to active responsive to receiving the activation signal from the at least one other power module. In at least one example, the module controller is coupled to a system controller coupled to the at least one other power module, and wherein determining that the power module is to be deactivated includes receiving a deactivation signal from the system controller.

In various examples, the power module further comprises an inverter including at least one switching device to control the output power, and deactivating the power module includes deactivating the at least one switch. In some examples, the power module further comprises a power bus between the module input and the inverter, and the power module is configured to maintain the power bus at an active operating voltage level while deactivated.

According to at least one example, a non-transitory computer-readable medium storing thereon sequences of computer-executable instructions for controlling a plurality of power modules is provided, the sequences of computer-executable instructions including instructions that instruct at least one processor to control the plurality of power modules to provide power to the output, receive load information indicative of a power drawn by a load from a load sensor, select, based on the load information, at least one power module of the plurality of power modules to maintain in an active state to provide power to the output, and deactivate each power module of the plurality of power modules other than the at least one power module based on selecting the at least one power module to maintain in the active state.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
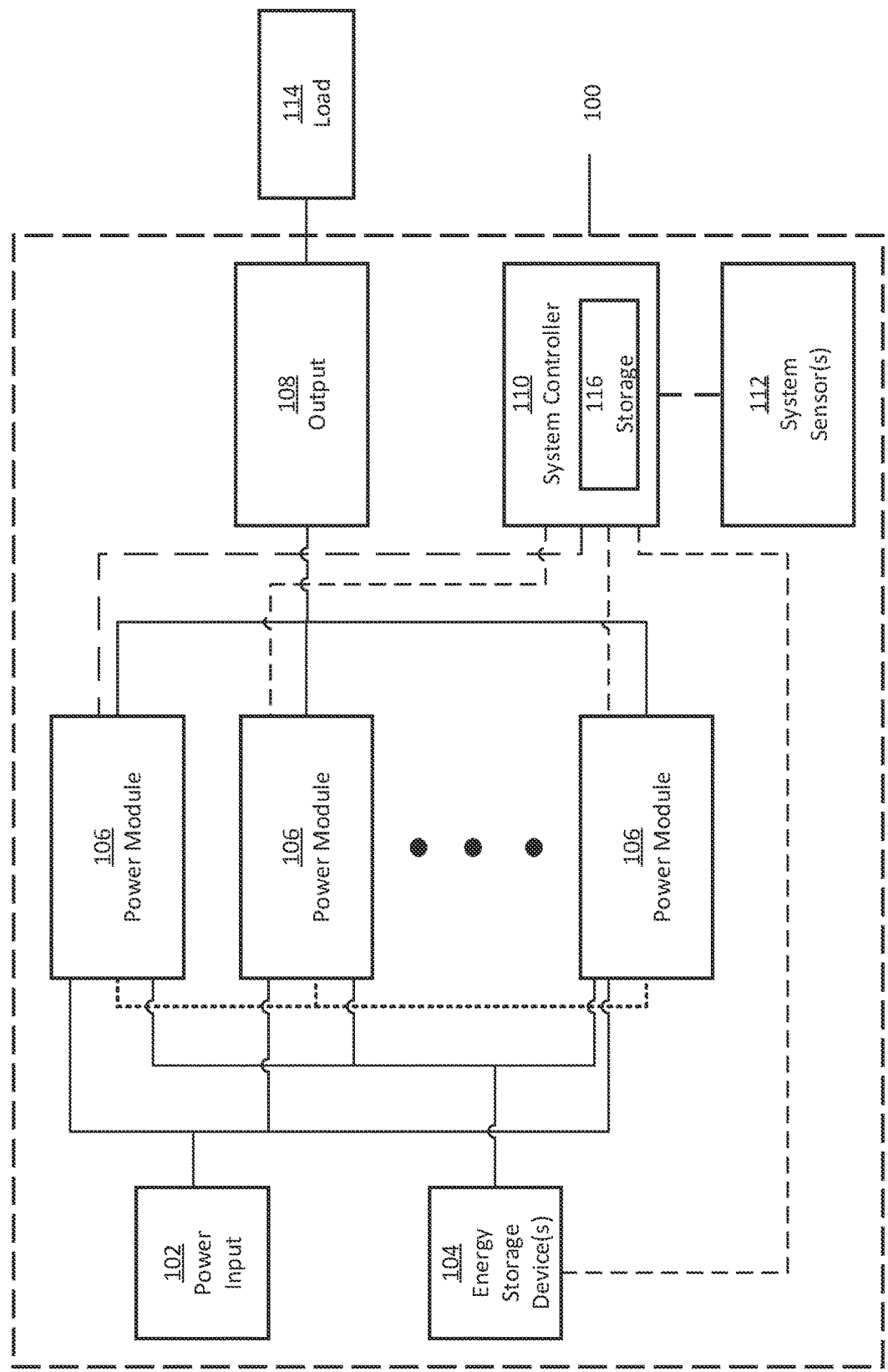
FIG. 1 illustrates a block diagram of a power system according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

As discussed above, uninterruptible power supplies (UPSs) are capable of providing uninterrupted power to certain loads. A modular UPS may include a configurable number of power modules, which may be added to or removed from the UPS to increase or decrease a maximum power output of the UPS, respectively. Each power module may have a respective power output rating, and a total power output rating of the modular UPS may be determined based on the sum of the active power modules' power output ratings. For example, a modular UPS having two active power modules, each having a respective power rating of 5 kW, may have an output power rating of approximately 10 kW, which is the sum of the modules' power ratings.

A power module may not operate at maximum capacity at all times. For example, a power module having a power rating of 5 kW may provide output power of any magnitude between 0 kW and 5 kW throughout the power module's lifecycle. In some examples, however, a power module may be restricted to operate within a certain range of power, such as within 20% to 95% of the power module's power rating. In this example, a power module having a power rating of 5 kW would therefore be restricted to outputting power between 1 kW and 4.75 kW. In other examples, any other range of power output values may be implemented, including 0% and 100% of a power module's power rating.

An efficiency of a power module may vary based on an output power of the power module compared to the power module's output power rating. For example, a 5 kW power module providing 1 kW of output power (thus operating at 20% of a rated output power) may operate less efficiently than when the power module provides 3.25 kW of output power (thus operating at 65% of a rated output power). Each power module may be associated with power module efficiency information indicating a corresponding efficiency for each level of output power, where a peak efficiency may be achieved at an output power value between a minimum output power value (for example, 20% of a rated output power) and a maximum output power value (for example, 95% of a rated output power) for some power modules. In some examples, the power module efficiency information may be stored as computer-readable information such that an electrical device having access to the information is capable of determining an efficiency of the power based on a load on the power module.

In a modular UPS having multiple power modules, it may be possible to satisfy a load demand with multiple different combinations of active power modules. For example, consider a modular UPS having three power modules, each rated at 5 kW, the modular UPS being connected to a load demanding 3 kW of power. In one example, all three of the power modules could provide 1 kW of output power each to satisfy the load's demand for a total of 3 kW of output power. In another example, two of the power modules could provide 1.5 kW of output power each to satisfy the load's demand for a total of 3 kW of output power, and the third power module could provide no output power. In yet another example, a single one of the power modules could provide 3 kW of output power to satisfy the load's demand for 3 kW of output power, and the remaining two power modules could provide no output power. In other examples, other combinations of power modules could be implemented with each power module providing an amount of output power that may be the same or different than that provided by other modules.

The efficiencies of the power modules in each of these examples may differ from one another. For example, a power module operating at one load (for example, 20% of a rated load) may have an efficiency that differs from an efficiency of the power module at a second load (for example, 50% of a rated load). Furthermore, electrical losses of the power module while the power module is active (for example, total active and reactive losses) may differ from electrical losses of the power module while the power module is not active. Accordingly, it may be advantageous to identify a most efficient combination of power modules to satisfy a load's demand such that a total efficiency of a modular UPS system may be maximized.

Examples are provided for increasing an efficiency of a modular UPS by selectively activating power modules in a UPS. Load information is determined by a system controller, and/or a module controller in one or more power modules to identify output power requirements of a load. A determination is made by the system controller as to which combination of power modules can most efficiently satisfy the output power requirements. The identified combination of power modules is instructed by the system controller to maintain an active state in which output power is provided to the load. The remaining power modules are instructed to enter a deactivated state in which the power modules do not provide output power to a load. For example, a deactivated power module may deactivate its inverter such that the output of the power module is disconnected from a power source of the power module.

The output power requirements of the load may change over time. The system and/or module controllers may repeatedly re-evaluate whether a wake-up condition is met, which may be based on the output power requirements. The wake-up condition may be that the output power requirements exceed the power rating of the combination of activated power modules, for example, or that the output power requirements have changed above a threshold amount. If the wake-up condition is met, every power module that was not already active (that is, the deactivated power modules) may be activated by the system and/or module controllers to provide output power to the load. The system controller again determines a combination of power modules that can most efficiently satisfy the output power requirements of the load, and deactivates the remaining power modules.

Current modular power systems, such as modular uninterruptible power supplies, may maintain all power modules therein in an active state at all, or substantially all, times that the modular power system is active. Such modular power systems may operate inefficiently, because each power module may not be operating at or near its peak efficiency and one or more power modules may be unnecessarily active. This is a technical problem. An exemplary embodiment of a modular power system may comprise an input to receive input power, an output to provide output power to a load, a sensor configured to provide load information indicative of power drawn by the load, a plurality of power modules, each power module of the plurality of power modules having a power module input configured to be coupled to the input, and a power module output configured to be coupled to the output, and a system controller coupled to the plurality of power modules and to the sensor. In some examples, the system controller is configured to control the plurality of power modules to provide power to the output, receive the load information from the sensor, select, based on the load information, at least one power module of the plurality of power modules to maintain in an active state to provide power to the output, and deactivate each power module of the plurality of power modules other than the at least one power module based on selecting the at least one power module to maintain in the active state. At least this foregoing combination of features comprises a modular power system that serves as a technical solution to the foregoing technical problem. This technical solution is not routine and is unconventional. This technical solution is a practical application of the power system design that solves the foregoing technical problem and constitutes an improvement in the technical field of power supply design at least by increasing an efficiency of a power supply system.

FIG. 1 illustrates a block diagram of a power system 100 according to an example. In some examples, the power system 100, or components thereof, may be or include a UPS, such as a modular UPS. The power system 100 includes a power input 102, one or more energy storage devices 104, an arbitrary number of power modules 106, an output 108, a system controller 110, and one or more system sensors 112. In some examples, the one or more energy storage devices 104 may not be external to, but may be electrically and communicatively coupled to, the power system 100. In one example, the power system 100 may be coupled to a load 114 via the output 108. The system controller 110 includes a storage 116 capable of storing computer-readable information. In some examples, the storage 116 may be internal to the system controller 110, whereas in other examples, the storage 116 may be partially or entirely external to the system controller 110, and may further be partially or entirely internal or external to the power system 100, albeit communicatively coupled to the system controller 110.

The power input 102 is coupled to each of the power modules 106, and is configured to be coupled to a power source (not illustrated). For example, the power input 102 may be coupled to a utility mains power supply, which may be an AC power supply. In other examples, the power input 102 may be connected to a DC power supply. The energy storage devices 104 are coupled to the power modules 106, and are communicatively coupled to the system controller 110. As discussed above, the one or more energy storage devices 104 may be external to the power system 100, but may be electrically coupled to the power modules 106 and communicatively coupled to the system controller 110. The power modules 106 are coupled to the power input 102, the energy storage devices 104, and the output 108, and are communicatively coupled to the system controller 110. In some examples, the power modules 106 are communicatively connected to each other. The output 108 is coupled to the power modules 106 and is configured to be coupled to the load 114.

The system controller 110 is communicatively coupled to the energy storage devices 104, the power modules 106, and the system sensors 112. The system sensors 112 are communicatively coupled to the system controller 110, and may be coupled to one or more additional components. For example, the system sensors 112 may include one or more temperature, voltage, current, and/or power sensors configured to sense temperature, voltage, current, and/or power information at any of the components 102-108, including load information at the output 108 indicative of output power drawn by the load 114 and/or power requirements of the load 114. The load 114 is configured to be coupled to the power system 100 via the output 108. The storage 116 is configured to be communicatively coupled to the system controller 110, and may store computer-readable information such as load information, power module efficiency information, and so forth.

The system controller 110 may control the power system 100 to operate in one of at least two modes of operation, including a normal mode of operation and a backup mode of operation, based on information received from the system sensors 112. For example, the system sensors 112 may sense input power information (for example, voltage and/or current information) indicative of input power received at the power input 102 and provide the input power information to the system controller 110, and/or may sense a temperature value indicative of an ambient temperature in or near one or more components of the power system 100 and provide the temperature information to the system controller 110. If the system controller 110 determines that the input power is acceptable (for example, by having a voltage level within a range of acceptable voltage levels), then the system controller 110 may control the power system 100 to be in the normal mode of operation. Otherwise, if the system controller 110 determines that the input power is not acceptable, then the system controller 110 may control the power system 100 to be in the backup mode of operation.

In the normal mode of operation, power received at the power input 102 is distributed to the power modules 106. As discussed in greater detail below, some or all of the power modules 106 may be in an active mode of operation. In the active mode of operation, a power module conditions the power received from the power input 102 and provides output power to the output 108. A power module may also provide power to the energy storage devices 104 to charge the energy storage devices 104 during the normal mode of operation.

In the backup mode of operation, power stored in the energy storage devices 104 is distributed to the power modules 106. Power modules in the active mode of operation may condition the power received from the energy storage devices 104 and provide output power to the output 108.

In both the normal and backup mode of operation, the output 108 may receive power from the power modules 106 and provide the power to the load 114. In some examples, the output 108 may include or be connected to one or more power distribution units (PDUs) to distribute power to one or more loads. For example, the load 114 may include multiple different loads, or the load 114 may be one of several loads receiving power from the output 108.

As discussed above, in some examples, some of the power modules 106 may be active and some of the power modules 106 may be inactive. In the active mode, a power module provides output power to the output 108. For example, the output power may be derived from input power received from one or both of the power input 102 or the energy storage devices 104. In the inactive mode, a power module does not provide output power to the output 108. As used herein, a "deactivated power module," "inactive power module," or a power module that has been "deactivated" or "inactivated" refers to a power module that is not providing output power to the output 108. However, even in the inactive mode, a power module may still receive power from the power input 102 and/or may provide or receive power to or from the energy storage devices 104. Furthermore, certain components of a deactivated power module may remain operational including, for example, a module controller of the power module, a rectifier of the module, and/or a DC/DC converter of the module, as discussed in greater detail below.

Figure 2:
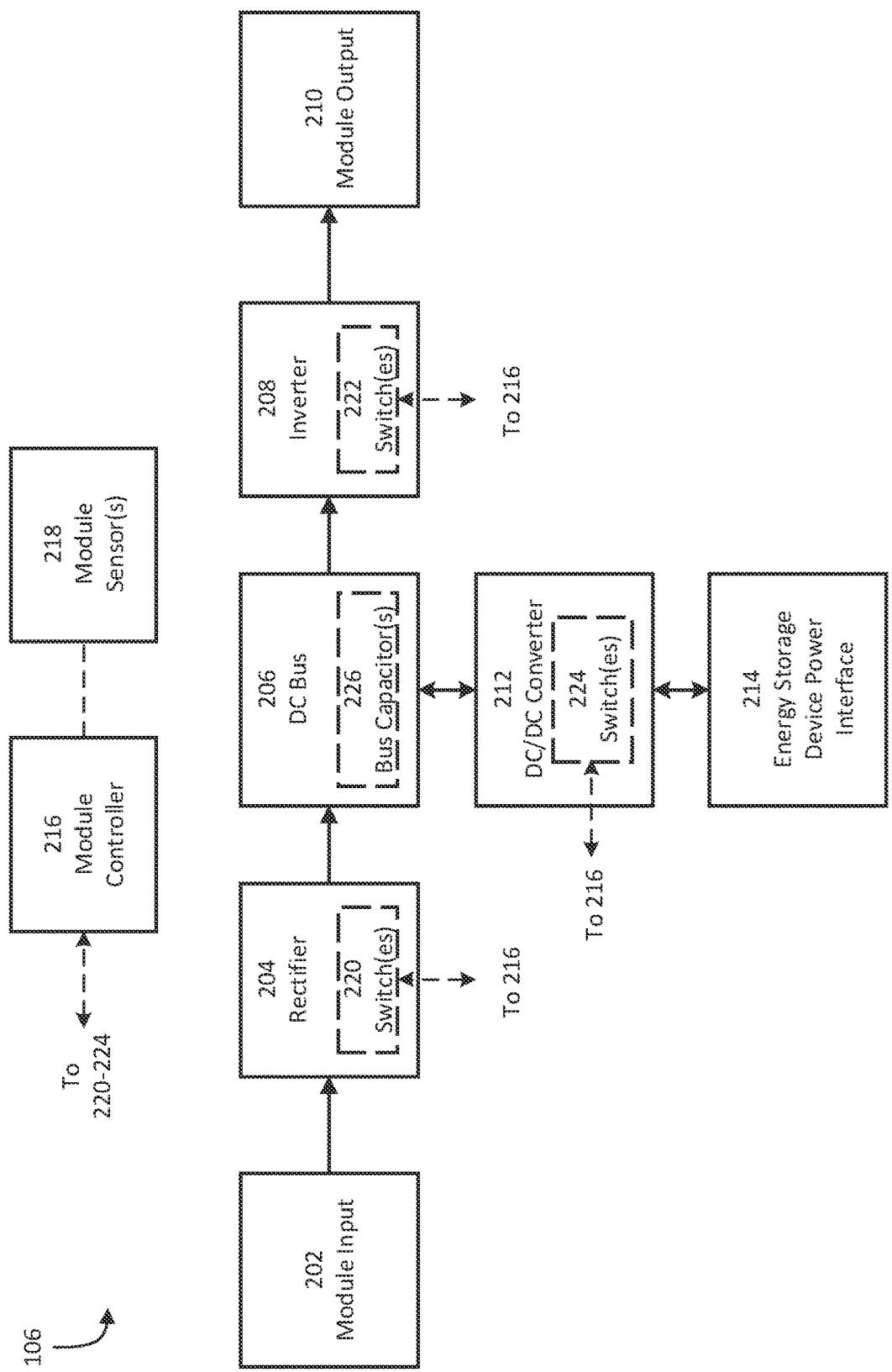
FIG. 2 illustrates a block diagram of a power module according to an example.

FIG. 2 illustrates a block diagram of a power module 106 according to an example. The power module 106 may be an example of any of the power modules 106 of FIG. 1. The power module 106 includes a module input 202, a rectifier 204, a DC bus 206, an inverter 208, a module output 210, a DC/DC converter 212, an energy storage device power interface 214, a module controller 216, and one or more module sensors 218. The rectifier 204 includes one or more rectifier switches 220, the inverter 208 includes one or more inverter switches 222, and the DC/DC converter 212 includes one or more converter switches 224. The DC bus 206 includes one or more bus capacitors 226.

The module input 202 is coupled to the rectifier 204, and is configured to be coupled to the power input 102. The rectifier 204 is coupled to the module input 202 and the DC bus 206. The DC bus 206 is coupled to the rectifier 204, the inverter 208, and the DC/DC converter 212. The inverter 208 is coupled to the DC bus 206 and to the module output 210. The module output 210 is coupled to the inverter 208 and the output 108. The DC/DC converter 212 is coupled to the DC bus 206 and to the energy storage device power interface 214. The energy storage device power interface 214 is coupled to the DC/DC converter 212, and is configured to be coupled to the energy storage devices 104. The module controller 216 is communicatively coupled to the module sensors 218 and to the switches 220-224. In some examples, the module controller 216 may further be communicatively coupled to the system controller 110 and/or to one or more other module controllers of one or more other power modules 106. The module sensors 218 are communicatively coupled to the module controller 216, and may be coupled to one or more additional components. For example, the module sensors 218 may include one or more temperature, voltage, current, and/or power sensors configured to sense temperature, voltage, current, and/or power information at any of the components 202-214, including load information at the module output 210 indicative of output power provided at the module output 210, power requirements of the load 114, and/or a voltage at the module output 210. The rectifier switches 204 are communicatively coupled to the module controller 216. The inverter switches 222 are communicatively coupled to the module controller 216. The converter switches 224 are communicatively coupled to the module controller 216.

In the normal mode of operation of the power system 100, the power module 106 is configured to receive input power from the power input 102 at the module input 202. In one example, the input power is AC power. The rectifier 204 is configured to rectify the AC power to DC power. For example, the module controller 216 may control the rectifier switches 220 to rectify the AC power to DC power. The DC power is provided to the DC bus 206.

The DC bus 206 conducts DC power to the inverter 208 and/or DC/DC converter 212, and to the bus capacitors 226. The bus capacitors 226 receive the DC power to maintain the DC bus 206 at a desired voltage level, which may be referred to herein as an "active operating voltage level." As understood by those of ordinary skill, it may be advantageous to maintain a DC bus from which an inverter receives electrical power at a certain voltage level for the inverter to convert power received therefrom to AC power.

DC power received from the rectifier 204 may be provided to the inverter 208 and/or the DC/DC converter 212. For example, if the power module 106 is in an active mode of operation in which the inverter 208 inverts DC power to AC power and provides the AC power to the module output 210, then the module controller 216 may control the inverter switches 222 such that the inverter 208 receives and inverts DC power stored by the bus capacitors 226 from the DC bus 206. However, in examples in which the bus capacitors 226 are maintained at the active operating voltage level even when the inverter 208 is not inverting power, the power module 106 may be able to quickly respond to a change in operation in which the inverter 208 does begin inverting power, because the voltage level on the DC bus 206 is already maintained at the active operating voltage level by the bus capacitors 226. Thus, the bus capacitors 226 need not be recharged from a discharged state, where such recharging may otherwise take a longer amount of time than if the bus capacitors 226 are already charged. The module controller 216 may therefore control the inverter 208 to provide output power to the output 108 via the module output 210 when the power module 106 is in the active mode of operation, where the power module 106 is able to quickly respond to a transition from a deactive to active mode of operation.

The module controller 216 may alternately or additionally control the converter switches 224 such that the DC/DC converter 212 receives and converts DC power from the DC bus 206, and provides the converted power to the energy storage device power interface 214. For example, the DC/DC converter 212 may provide DC power to the energy storage device power interface 214 to charge one or more of the energy storage devices 104 connected thereto. In some examples, the DC/DC converter 212 may charge the energy storage devices 104 when the power module 106 is in either the active or inactive mode of operation. For example, the energy storage devices 104 may include one or more batteries, capacitors, flywheels, or other rechargeable energy storage devices capable of being recharged via the DC/DC converter 212.

In the backup mode of operation of the power system 100, the power module 106 does not receive power at the module input 202. The power module 106 may receive DC power from the energy storage devices 104 at the energy storage device power interface 214. Power received from the energy storage device power interface 214 is provided to the DC/DC converter 212. The module controller 216 may control the converter switches 224 to convert power received from the energy storage device power interface 214 to DC power of a different voltage level, and provide the converted power to the DC bus 206. The DC bus 206 may conduct the received power to the inverter 208 and/or the bus capacitors 226. As discussed above, if the power module 106 is in an active mode of operation, then the module controller 216 may control the inverter switches 222 to draw power via the DC bus 206 and provide inverted output power to the module output 210. Otherwise, the inverter 208 may not draw any appreciable power from the DC bus 206 if the power module 106 is in the deactive mode of operation.

Accordingly, the power system 100 may operate at least in a normal mode of operation or a backup mode of operation. In the normal and/or the backup modes of operation, each power module 106 may be in either an active mode or a deactive mode. For power modules in an active mode, power received from the power input 102 and/or the energy storage devices 104 (depending on whether the power system 100 is in a normal or backup mode of operation) may be provided to the output 108 via the module output 210 of a respective power module 106. Otherwise, if a power module 106 is in an inactive mode, the power module 106 may not provide power to the module output 210 and, consequently, the output 108. However, even in the inactive mode, components of the power module 106 may remain operational, including one or more of the rectifier 204, the DCDC converter 212, the module controller 216, and/or the module sensors 218. The module controller 216 may control the power module 106 to draw power from the power input 102 and/or the energy storage devices 104 to maintain the bus capacitors 226 at an active operating voltage level, such that the power module 106 is able to quickly respond to an instruction to provide output power. For example, the module controller 216 may control the rectifier 204 to draw power from the module input 202 and/or may control the DC/DC converter 212 to draw power from, or provide power to, the energy storage device power interface 214. Furthermore, a deactivated power module may monitor load information at a respective module output 210.

Figure 3:
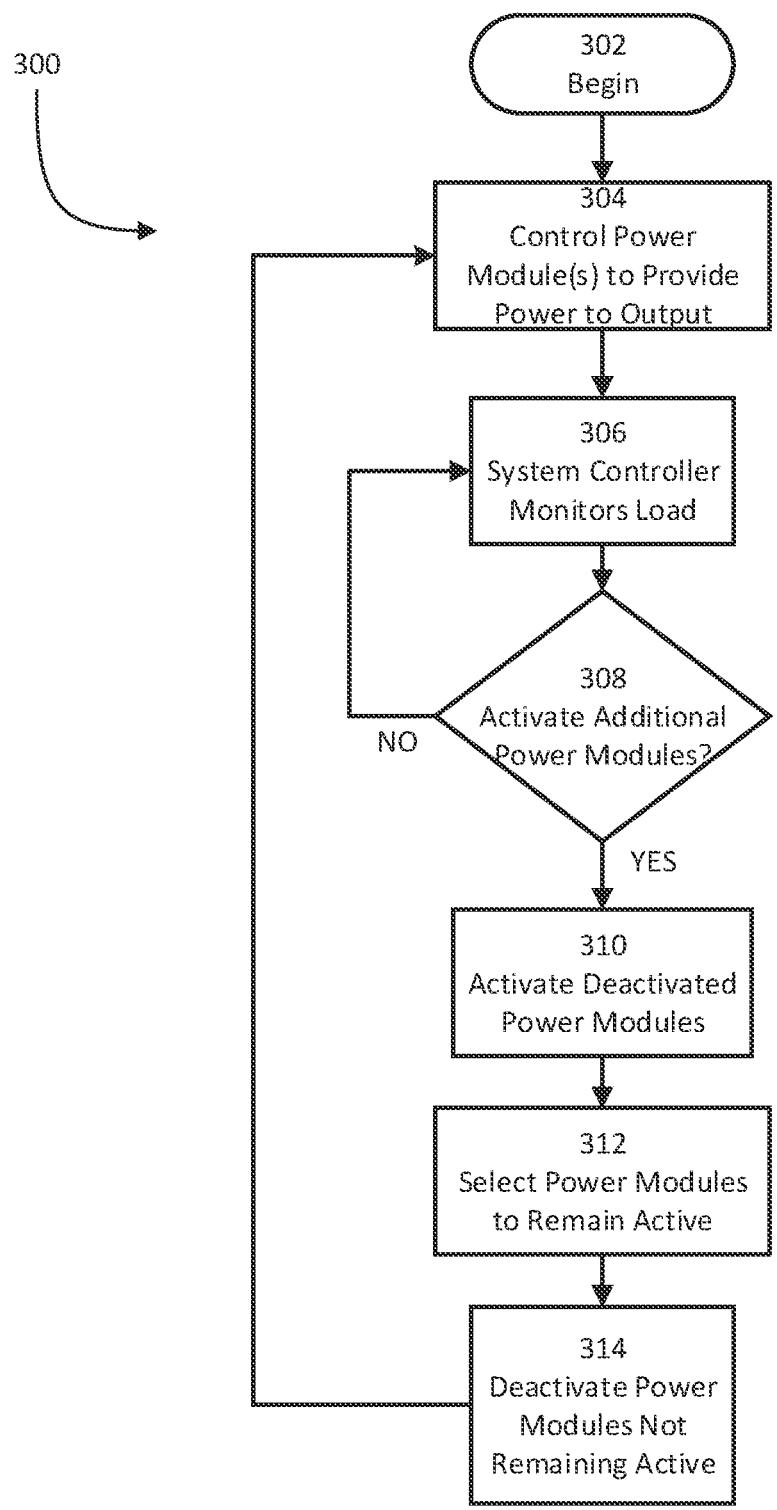
FIG. 3 illustrates a process of controlling a power system according to an example.
Figure 4:
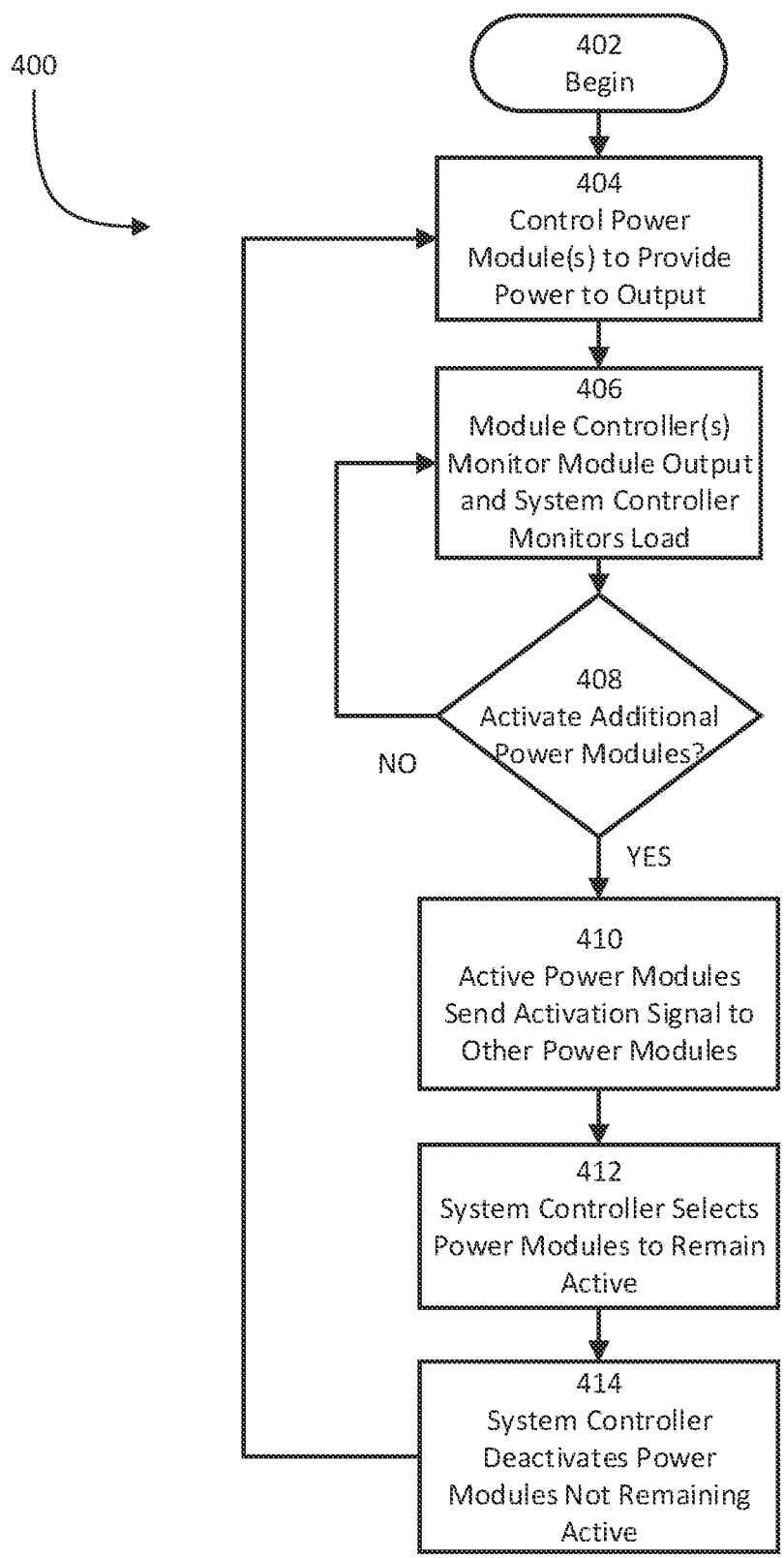
FIG. 4 illustrates a process of controlling a power system according to another example.

Operation of the power system 100 will now be discussed with respect to FIGS. 3 and 4. FIG. 3 illustrates a process 300 of operating the power system 100 according to an example. The process 300 may be executed in connection with one or more components of the power system 100, including the system controller 110. FIG. 4 illustrates a process 400 of operating the power system 100 according to another example. The process 400 may be executed in connection with one or more components of the power system 100, including a respective module controller 216 of one or more of the power modules 106. In some examples, the processes 300, 400 may both be executed by the power system 100, including by executing the processes 300, 400 simultaneously.

At act 302, the process 300 begins. For example, the process 300 may begin at a system start-up of the power system 100, or at another time thereafter. As discussed in greater detail below, acts of the process 300 may be executed repeatedly and, in some examples, indefinitely.

At act 304, the system controller 110 controls one or more of the power modules 106 to provide power to the output 108. The system controller 110 may control fewer than all of the power modules 106 to provide power to the output 108, or may control all of the power modules 106 to provide power to the output 108. For example, the system controller 110 may control all of the power modules 106 to provide power to the output 108 when the process 300 and act 304 are first executed before a more efficient subset of the power modules 106 is identified, in examples in which such a subset is identified, as discussed in greater detail below.

Controlling the one or more of the power modules 106 to provide power to the output 108 may include sending an activation signal from the system controller 110 to each of the one or more power modules 106 to provide power (also referred to herein as "activating" the one or more power modules 106). The activation signal may be sent from the system controller 110 to a respective module controller 216. The module controller 216, in turn, may control the respective components of the power module 106 to provide power to the module output 210, such as by controlling the switches 220-224 to provide power to the module output 210. Controlling the switches 220-224 to provide power to the module output 210 may include controlling the inverter switches 222 to draw DC power from the bus capacitors 226, invert the DC power to AC power, and provide the AC power to the module output 210. In other examples, act 304 may include the system controller 110 directly controlling the components of the power module 106, including the inverter switches 222, to provide power to the module output 210.

At act 306, the system controller 110 monitors the load 114. For example, the system controller 110 may monitor the load 114 to determine load information indicative of a power drawn by the load 114 at the output 108, and power requirements of the load 114. The system controller 110 may determine the load information based on information sensed by the system sensors 112, including information sensed at the output 108. For example, the system sensors 112 may include one or more current or voltage sensors configured to sense a current and/or voltage at the output 108, and/or at an output of each of the power modules 106. The system sensors 112 may provide the load information to the system controller 110. In other examples, the power module 106 may provide the load information to the system controller 110, where a respective module controller 216 of a power module 106 may obtain module load information by polling the module sensors 218, and send the module load information to the system controller 110.

At act 308, the system controller 110 determines whether additional power modules should be activated. For example, the system controller 110 may determine that additional power modules should be activated where an "overload condition" is detected. An overload condition may be detected where the output power requirements of the load 114 increase beyond the output power capacity of the power modules 106 that are controlled to provide output power at act 304. Such an overload condition may be indicated by certain electrical parameters (for example, an output current, voltage, and/or power) falling outside of an acceptable range or ranges of values, such as a sub-cycle disturbance in output power provided to the load 114, or an amount of current provided to the load 114 being greater than a rated maximum output current of the power modules 106, or another example of a disturbance in electrical parameters. It may be desirable to activate additional power modules to meet the output power requirements if an overload condition is detected. In other examples, the system controller 110 may determine that an overload condition exists even if the power modules 106 that are controlled to provide output power at act 304 are capable of meeting the increased output power requirements of the load 114. For example, the system controller 110 may detect an overload condition in such a scenario where the system controller 110 determines that activating additional power modules would nonetheless be desirable because activating additional power modules would increase an efficiency of the power system 100.

If the system controller 110 determines that additional power modules 106 should not be activated (308 NO), then the process 300 returns to act 306. The system controller 110 resumes monitoring the load 114, and acts 306 and 308 are repeated until a determination is made that additional power modules 106 should be activated. For example, if the system controller 110 detects an overload condition and determines that additional power modules 106 should be activated (308 YES), then the process 300 continues to act 310.

At act 310, the system controller 110 activates any of the power modules 106 that are deactivated. Deactivated power modules may include those of the power modules 106 that are not controlled to provide output power to the output 108 at act 304. Activating the power modules 106 at act 310 may be similar to act 304. For example, the system controller 110 may send an activation signal to each of the power modules 106 that is deactivated, and a corresponding module controller 216 may control the power module 106 to provide output power to the output 108 responsive to receiving the activation signal. Once each of the power modules 106 has been activated, the power modules 106 collectively provide power to the output 108 at a first efficiency.

At act 312, the system controller 110 selects at least one power module of the power modules 106 to maintain in an active state based on the load information received at act 306. The at least one power module will provide power to the output 108 at a second efficiency, which may be different than the first efficiency if the at least one power module includes fewer than all of the power modules 106. In various examples, the system controller 110 may select the at least one module such that the at least one module is capable of meeting the output power requirements of the load, and such that the second efficiency is greater than the first efficiency. In some examples, therefore, the system controller 110 determines a most efficient group of the power modules 106 capable of meeting output power requirements, or at least determines a group of power modules 106 capable of meeting the output power requirements with a greater efficiency than if all of the power modules 106 were maintained in an active state.

In some examples, the system controller 110 may access stored efficiency information indicative of an efficiency of each of the power modules 106. For example, the efficiency information may be accessibly stored in the storage 116. The efficiency information may indicate a power efficiency of the power module 106 against a load on the power module 106. For example, the efficiency information may indicate a first efficiency where the power module 106 is providing 25% of a rated load, a second efficiency where the power module 106 is providing 50% of a rated load, a third efficiency where the power module 106 is providing 75% of a rated load, and so forth. Act 312 may include using the efficiency information to determine a most efficient group of the power modules 106 that is capable of satisfying the output load requirements. For example, the system controller 110 may determine that the output power requirements of the load 114 could be satisfied by four of the power modules 106 operating at 45% of a rated load, three of the power modules 106 operating at 60% of a rated load, or two of the power modules 106 operating at 90% of a rated load. The system controller 110 may then use the efficiency information to determine which number and combination of the power modules 106 is most appropriate, and select these power modules to remain active at act 312.

At act 314, the system controller 110 deactivates those of the power modules 106 that are not remaining active. Deactivating the power modules 106 may include sending, by the system controller 110, a deactivation signal to each of the power modules 106 not remaining active, or may include de-asserting an activation signal that the system controller 110 previously sent to the power modules 106. The power modules 106 discontinue providing output power to the output 108 responsive to receiving the deactivation signal. A respective module controller 216 may receive the deactivation signal and, in response thereto, control components thereof, such as the switches 220-224, to discontinue providing power to the module output 210. For example, the module controller 216 may control the inverter switches 222 to discontinue providing output power at the module output 210 (also referred to herein as "deactivating the inverter 208"), which may include controlling one or more of the inverter switches 222 to be in an open and non-conducting position, such that the DC bus 206 is electrically disconnected form the module output 210. In other examples, deactivating the power modules 106 may include the system controller 110 directly controlling components of the power modules 106, such as one or more of the switches 220-224, to discontinue providing output power at the module output 210. In various examples, certain components of the power module 106, including the module controller 216 and the sensors 218, remain operational even where the power module 106 is in a deactive mode.

The process 300 then returns to act 304. At act 304, the system controller 110 controls those of the power modules 106 selected to remain active at act 312 to provide output power at the output 108. Those of the power modules 106 that are deactivated may not be controlled to provide output power at the output 108, such as by deactivating the inverter 208 thereof. However, those of the power modules 106 that are deactivated may be controlled to perform certain operations, such as monitoring module load information at the module output 210 using the module sensors 218. A respective module controller 216 of a deactivated power module may also control the power module to draw power from the module input 202 or the energy storage device power interface 214 to maintain the bus capacitors 226 at an active operating voltage level, as discussed above.

A respective module controller 216 of a deactivated power module may also control the power module to provide a charging current to the energy storage devices 104 via the energy storage device power interface 214. For example, the module controller 216 may control the switches 220, 224 to draw AC power from the module input 202, rectify the AC power to DC power, provide the DC power to the DC bus 206, draw the DC power from the DC bus, convert the DC power to converted DC power, and provide the converted DC power to the energy storage device 104 via the energy storage device power interface 214. In other examples, a deactivated power module may not provide output power via the energy storage device power interface 214.

Turning to FIG. 4, at act 402, the process 400 begins. For example, the process 400 may begin at a system start-up of the power system 100, or at another time thereafter. As discussed in greater detail below, acts of the process 400 may be executed repeatedly and, in some examples, indefinitely.

At act 404, the system controller 110 controls one or more of the power modules 106 to provide power to the output 108. Act 404 may be substantially similar to act 304. The system controller 110 may control fewer than all of the power modules 106 to provide power to the output 108, or may control all of the power modules 106 to provide power to the output 108. For example, the system controller 110 may control all of the power modules 106 to provide power to the output 108 when the process 400 and act 404 are first executed before a more efficient subset of the power modules 106 is identified, if such a subset is so identified, as discussed in greater detail below. Controlling the one or more of the power modules 106 to provide power to the output 108 may include the system controller 110 sending an activation signal to each of the one or more power modules 106 (also referred to herein as "activating" the one or more power modules 106), similar to act 304.

At act 406, one or more module controllers 216 of respective power modules 106 monitor a respective module output 210, and the system controller 110 monitors the load 114. The system controller 110 may monitor the load 114 in a manner similar to the manner discussed above with respect to act 306. A module controller 216 may similarly monitor the load 114 by determining module load information indicative of output power provided at the module output 210 (including, for example, voltage and/or current information), and determining power requirements of the load 114. In another example, module load information may include information indicative of power drawn by the load 114 where power may or may not be provided at the module output 210. The module controller 216 may determine the module load information based on information sensed by the module sensors 218, including information sensed at the module output 210. For example, the module sensors 218 may include one or more current or voltage sensors configured to sense a current and/or voltage at the module output 210. The module sensors 218 provide the module load information to the module controller 216. In some examples, each module controller 216 may be communicatively coupled to one or more sensors, such as the system sensors 112, configured to determine load information indicative of a power drawn at the output 108 in addition to the module sensors 218. Accordingly, each module controller 216 may determine load information indicative of a power drawn at a respective module output 210 and/or at the output 108 of the power system 100.

In some examples, a respective module controller 216 of each of the power modules 106 monitors a respective module output 210 at act 406. In other examples, only module controllers 216 corresponding to active power modules 106 monitor a respective module output 210. In other examples, only module controllers 216 corresponding to deactivated power modules 106 monitor a respective module output 210. In other examples, a combination of module controllers 216 corresponding to active and deactivated power modules 106 monitor a respective module output 210. In various examples, load information determined by a module controller 216 may vary based on whether the module controller 216 corresponds to an active power module 106. For example, if the module controller 216 corresponds to an inactive power module 106 having an inactive inverter 208, the module sensors 218 may provide voltage information indicative of a voltage at the module output 210 to the module controller 216, but the module sensors 218 may not provide output current information to the module controller 216. In another example, if the module controller 216 corresponds to an active power module 106 having an active inverter 208, the module sensors 218 may provide voltage information indicative of a voltage at the module output 210 and current information indicative of a current provided by the inverter 208 to the module controller 216. In other examples, the module controller 216 may determine other load information or no load information based on a mode of operation.

At act 408, each module controller 216 monitoring the load 114 determines whether additional power modules should be activated. If an overload condition is determined to exist by a respective module controller 216, then the module controller 216 may determine that additional power modules should be activated. As discussed above, an overload condition may be detected where the output power requirements of the load 114 increase beyond the output power capacity of the power modules 106 that are providing output power, for example, or where activating additional power modules 106 would be desirable even if the increased output power requirements are capable of being met by the currently active power modules 106. In one example, detecting an overload condition may include the module controller 216 determining, based on current information received from the module sensors 218, that an output current provided by the inverter 208 is outside of a range of acceptable current values (for example, indicating an overcurrent condition). In another example, detecting the overload condition may include the module controller 216 determining, based on voltage information received from the module sensors 218, that an output voltage provided at the output 108 is outside of a range of acceptable voltage values (for example, indicating a voltage sag condition). In another example, detecting the overload condition may include the module controller 216 determining, based on power information received from the module sensors 218 (including, for example, current and/or voltage information), that an output voltage provided at the output 108 is outside of a range of acceptable voltage values (for example, indicating a voltage sag condition).

If the module controller 216 monitoring the load 114 determines that additional power modules 106 should not be activated (408 NO), then the process 400 returns to act 406. The module controller 216 continues monitoring the load 114, and acts 406 and 408 are repeated until a determination is made that additional power modules 106 should be activated. For example, if the module controller 216 detects an overload condition and determines that additional power modules 106 should be activated (408 YES), then the process 400 continues to act 410.

At act 410, each active module controller 216 that determines that additional power modules 106 should be activated (408 YES) activates any of the power modules 106 that are deactivated. Deactivated power modules may include those of the power modules 106 that are not controlled to provide output power at the output 108 at act 404. In some examples, activating the deactivated power modules 106 may include sending, by each active module controller 216, an activation signal to all other power modules 106, or a subset of the power modules 106, such as those of the power modules 106 that are deactivated. For example, the signal sent to the system controller 110 may include a request or instruction for the system controller 110 to send an activation signal to all of the power modules 106, or those of the power modules 106 that are deactivated. In other examples, each module controller 216 of a deactivated power module 106 may activate itself at act 410, and may or may not send an activation signal to the other power modules 106. Once each of the power modules 106 has been activated, the power modules 106 collectively provide power to the output 108 at a first efficiency.

At act 412, the system controller 110 selects at least one power module of the power modules 106 to maintain in an active state based on the load information received at act 406. Act 412 may be substantially similar to act 312. As discussed above, selecting the at least one power module may include selecting fewer than all of the power modules 106 to provide output power to the output 108 at an efficiency greater than if all of the power modules 106 were to provide output power to the output 108.

At act 414, the system controller 110 deactivates those of the power modules 106 that are not remaining active. Deactivating the power modules 106 may include sending, by the system controller 110, a deactivation signal to each of the power modules 106 not remaining active, or may include de-asserting an activation signal that the system controller 110 sent to the power modules 106 at act 310. The power modules 106 discontinue providing output power to the output 108 responsive to receiving the deactivation signal. A respective module controller 216 may receive the deactivation signal and, in response thereto, control components thereof, such as the switches 220-224, to discontinue providing power to the module output 210. For example, the module controller 216 may control the inverter switches 222 to discontinue providing output power at the module output 210 (also referred to herein as "deactivating the inverter 208"), which may include controlling one or more of the inverter switches 222 to be in an open and non-conducting position such that the DC bus 206 is electrically disconnected from the module output 210. In other examples, deactivating the power modules 106 may include the system controller 110 directly controlling components of the power modules 106, such as one or more of the switches 220-224, to discontinue providing output power at the module output 210.

The process 400 then returns to act 404. At act 404, the system controller 110 controls those of the power modules 106 selected to remain active at act 412 to provide output power at the output 108. Act 404 is substantially similar to act 304.

Accordingly, the processes 300, 400 may be executed to select a group of one or more of the power modules 106 to maintain in an active state in which power is provided to the output 108. Remaining power modules may be deactivated such that power is not provided to the output 108. Providing power to the output 108 with fewer than all of the power modules 106 may increase an efficiency of the power system 100 as compared to providing power to the output 108 with all of the power modules 106.

If power requirements of the load 114 change after selecting the group of one or more of the power modules 106 to maintain in an active state (for example, increase), additional power modules may be activated. In the process 300, the system controller 110 monitors power information (including, for example, current and voltage information) with the system sensors 112 to determine if additional power modules should be activated. In the process 400, a respective module controller 216 of one or more of the power modules 106 monitors load information with the module sensors 218 and/or the system sensors 112 to determine if additional power modules should be activated. In some examples, the power system 100 may execute only one of the processes 300, 400 at one time. In other examples, the power system 100 may execute both of the processes 300, 400 simultaneously, alternately, or some combination thereof.

As discussed above in connection with acts 308 and 408, a determination may be made by the system controller 110 and/or a module controller 216 as to whether to activate additional power modules. In some examples, including examples provided above, additional power modules may be activated responsive to determining that the output power requirements of the load 114 exceed an output power capacity of the currently active power modules 106. In other examples, additional power modules may be activated responsive to other conditions in addition to, or in lieu of, determining that the output power requirements of the load 114 exceed an output power capacity of the currently active power modules 106. Such conditions may be referred to herein as "wake-up conditions," and may include the output power requirements of the load 114 exceeding an output power capacity of the currently active power modules 106.

Other wake-up conditions may include the output power requirements of the load 114 changing by more than a threshold amount after the group of the power modules 106 to provide power to the load 114 is selected. The threshold amount may be a relative value (for example, a 10% change in output power requirements) or an absolute value (for example, a 500 W change in output power requirements). Multiple thresholds may be implemented. For example, a wake-up condition may be satisfied if the output power requirements of the load 114 increase by more than a first threshold amount or decrease more than a second threshold amount, which may be different than the first threshold amount.

Other wake-up conditions may include a threshold amount of time having elapsed since the group of the power modules 106 to provide power to the load 114 was selected. The threshold amount of time may vary based on a number of the power modules 106 that are active.

Other wake-up conditions may be based in part on power received at the power input 102. For example, if power at the power input 102 becomes acceptable after being unacceptable, or becomes unacceptable after being acceptable, the wake-up condition may be satisfied. In another example, a wake-up condition may be based on anomalies in the power received at the power input 102 including, for example, certain power transient conditions.

Other wake-up conditions may be based in part on power stored in the energy storage devices 104. For example, a wake-up condition may be satisfied if the power system 100 is operating in a back-up mode of operation and one or more of the energy storage devices 104 becomes depleted of stored energy. In another example, a wake-up condition may be satisfied if the power system 100 is operating in a normal mode of operation and is charging the energy storage devices 104, and one or more of the energy storage devices 104 becomes fully charged.

Other wake-up conditions may be based on a status condition of the power system 100. For example, a wake-up condition may be satisfied if any anomalies or error conditions are detected. Such error conditions may include, for example, a component failure, a parameter (for example, temperature) falling outside or inside a range of values, and so forth.

In various examples, other wake-up conditions may be implemented. Furthermore, one or more of the foregoing wake-up conditions may be implemented in combination with one another. Accordingly, no limitation is implied by the example wake-up conditions identified above.

As discussed above, the system controller 110 may identify a group of one or more of the power modules 106 to maintain in an active mode of operation. In some examples, the system controller 110 identifies a group of one or more of the power modules 106 that provides power to the output 108 at a highest efficiency. For example, the system controller 110 may determine, based on stored efficiency information, an efficiency of the power system 100 for every combination of the power modules 106 being in an active state and select the most efficient group of the power modules 106.

In other examples, the system controller 110 may select the group of the power modules 106 to maintain in an active state based on one or more additional or alternate parameters. For example, the system controller 110 may consider a temperature of one or more components of the power system 100 in selecting the group of the power modules 106 to maintain in an active state. In one example, the system controller 110 may select a highest-efficiency group of the power modules 106 where components of the power system 100 are within a first range of temperature values, but may select a different group of the power modules 106 that does not provide a highest efficiency where components of the power system 100 are within a second range of temperature values. If the power system 100 is too hot, for example, it may be undesirable to prioritize efficiency over other concerns. Furthermore, in various examples, the system controller 110 may have access to stored efficiency information for the power modules 106 indicating an efficiency-versus-load for various temperature values (for example, stored in the storage 116), such that the system controller 110 may determine an efficiency of each of the power modules 106 operating at a certain load and at a certain temperature.

In another example, the system controller 110 may select a group of the power modules 106 to maintain in an active state based on additional parameters. For example, the system controller 110 may determine that maintaining a first group of the power modules 106 in an active state is more efficient than maintaining a second group of the power modules 106 in an active state. The system controller 110 may nonetheless maintain the second group of the power modules 106 in the active state rather than the first group based on considerations other than, or in addition to, efficiency. For example, the first and second group may each include two power modules, but the modules of the first group of power modules may have consumed more of their operating lifetimes than those of the second group. The system controller 110 may select the second group to maintain in an active state, such that the operating lifetimes of the first and second groups are balanced. In this example, however, if the efficiency of the first group exceeds the efficiency of the second group by more than a certain amount, the system controller 110 may nonetheless select the first group to maintain in an active state if efficiency concerns outweigh an interest in balancing operating lifetimes. It is to be appreciated that other examples are within the scope of the disclosure, and that efficiency-increasing concerns or interests may be balanced with other benefits.

In some examples, the power system 100 may be configured to receive AC power from the power input 102. However, in other examples, the power system 100 may be configured to receive DC power. One or more of the power modules 106 may be configured to receive DC power at a respective module input 202 in addition to, or in lieu of, AC power. In these examples, the rectifier 204 may be replaced by a component configured to receive and/or filter DC power from the module input 202 (for example, a DC/DC converter), and provide output power to the DC bus 206. In other examples, the rectifier 204 may be removed without being replaced, such that the module input 202 is coupled directly to the DC bus 206. Similarly, the inverter 208 may be removed and may be replaced by a different component, such as a DC/DC converter, a switching device, or a similar component. In still other examples, the rectifier 204 and/or the inverter 208 may be replaced or supplemented by components configured to operate in connection with either DC or AC power, such that the power module 106 is capable of receiving either AC or DC power at the module input 202, and is capable of outputting either AC or DC power at the module output 210. In some examples, the power system 100 may be configured to receive AC power at the power input 102, but may be configured to provide DC power, rather than AC power, at the module output 210. In these examples, the inverter 208 may be replaced by an alternate component configured to output DC power. Accordingly, it is to be appreciated that the principles of the disclosure are not limited to any particular type of input or output power.

In some examples, a range of permissible loads for each of the power modules 106 may vary based on the load 114. For example, the power modules 106 may be capable of operating between 20% and 95% of a rated load where the load 114 is a first type of load (for example, a non-critical load). However, the power modules 106 may be capable of operating only between 20% and 75% of a rated load where the load 114 is a second type of load (for example, a critical load). Different loads may be categorized into various categories, each of which may be restricted to a specified range of a rated load. In some examples, each of the power modules 106 may have a different permissible range. For example, one or more of the power modules 106 may be of a different type, or have a different rating, than others of the power modules 106.

As discussed above, deactivating a power module 106 may include controlling, by a respective module controller 216, respective inverter switches 222 to be in an open and non-conducting position such that the DC bus 206 and the bus capacitors 226 are electrically disconnected from the module output 210. In various examples, the rectifier 204 and/or the DC/DC converter 212 may remain operational while the power module 106 is deactivated such that the bus capacitors 226 remain at an active operating voltage. In some examples, the rectifier 204 and/or the DC/DC converter 212 may not remain operational while the power module 106 is deactivated. Whether the rectifier 204 and/or the DC/DC converter 212 remain operational may depend on a type or operating requirements of the load 114. For example, if the load 114 is less sensitive to interruptions in power provision, the rectifier 204 and/or the DC/DC converter 212 may not maintain the bus capacitors 226 at an active operating voltage in some examples. Conversely, if the load 114 is sensitive to interruptions in power provision, the bus capacitors 226 may be maintained at an active operating voltage such that the power module 106 is capable of quickly transitioning to providing output power via the inverter 208.

Although certain examples may be implemented in connection with modular uninterruptible power supplies, it is to be appreciated that other examples may be implemented in connection with other devices. In some examples, principles of the disclosure may be practiced in connection with a non-modular power device having a fixed number of power-conditioning components in lieu of the power modules 106. In another example, principles of the disclosure may be implemented to select a most efficient group of components other than power modules to maintain in an active state, such as one or more energy storage devices capable of being selectively activated or deactivated to discharge stored energy. In some examples, principles of the disclosure may be implemented in connection with a device other than an uninterruptible power supply.

Accordingly, examples discussed herein enable an efficiency of a modular UPS to be increased by selectively activating power modules in a UPS. Load information is determined by a system controller and/or a module controller in one or more power modules to identify output power requirements of a load. A determination may be made by the system controller as to which combination of power modules can most efficiently satisfy the output power requirements. The identified combination of power modules may be instructed by the system controller to maintain an active state in which output power is provided to the load. The remaining power modules may be instructed to enter a deactivated state in which the power modules do not provide output power to a load. For example, a deactivated power module may deactivate its inverter such that the output of the power module is disconnected from a power source of the power module.

The output power requirements of the load may change over time. The system and/or module controllers may repeatedly re-evaluate whether a wake-up condition is met, which may be based on the output power requirements. The wake-up condition may be that the output power requirements exceed the power rating of the combination of activated power modules, for example, or that the output power requirements have changed above a threshold amount. If the wake-up condition is met, power modules that were not already active (that is, the deactivated power modules) may be activated by the system and/or module controllers to provide output power to the load. The system controller again determines a combination of power modules that can most efficiently satisfy the output power requirements of the load, and deactivates the remaining power modules.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:
1. A power system comprising:
an input to receive input power;
an output to provide output power to a load;
a sensor configured to provide load information indicative of power drawn by the load;
a plurality of power modules, each power module of the plurality of power modules having
a power module input configured to be coupled to the input,
a power module output configured to be coupled to the output,
an AC/DC converter coupled to the power module input,
a DC/AC inverter coupled to the power module output,
a power bus coupled to the AC/DC converter and the DC/AC inverter,
a module sensor configured to determine module load information indicative of power provided at a respective power module output, and
a module controller configured to receive the module load information from the module sensor, wherein each module controller is configured to, while activated,
detect, based on the module load information, an overload condition, and
provide an activation signal to at least one other power module of the plurality of power modules based on detecting the overload condition; and
a system controller coupled to the plurality of power modules and to the sensor, the system controller being configured to:

control the plurality of power modules to provide power to the output;

receive the load information from the sensor; and after each activated module controller provides the activation signal to the at least one other power module of the plurality of power modules such that each power module of the plurality of power modules is activated, select, in response to the overload condition and based on the load information, at least one power module of the plurality of power modules to maintain in an active state to provide power to the output; and deactivate each power module of the plurality of power modules other than the at least one power module based on selecting the at least one power module to maintain in the active state.

2. The power system of claim 1, wherein each activated module controller is communicatively coupled to the system controller and is configured to:

receive, from the system controller, a deactivation signal or an activation signal;

control the respective power module to continue providing module output power responsive to receiving the activation signal; and control the respective power module to deactivate and discontinue providing module output power responsive to receiving the deactivation signal.

3. The power system of claim 2, wherein the system controller is configured to:

select a first group of one or more power modules to maintain in an active state responsive to the overload condition;

provide the activation signal to each power module in the first group of one or more power modules;

select a second group of one or more power modules to deactivate responsive to the overload condition; and provide the deactivation signal to each power module in the second group of one or more power modules.

4. The power system of claim 3, wherein selecting the first group of one or more power modules to maintain in the active state includes identifying a most efficient group of one or more power modules to satisfy the overload condition.

5. The power system of claim 1, wherein the system controller is configured to:

detect, based on the load information, an overload condition; and activate each deactivated power module of the plurality of power modules to provide module output power based on detecting the overload condition.

6. The power system of claim 5, wherein the system controller is configured to:

select a first group of one or more power modules to maintain in an active state responsive to the overload condition;

provide the activation signal to each power module in the first group of one or more power modules;

select a second group of one or more power modules to deactivate responsive to the overload condition; and provide the deactivation signal to each power module in the second group of one or more power modules.

7. The power system of claim 6, wherein selecting the first group of one or more power modules to maintain in the active state includes identifying a most efficient group of one or more power modules to satisfy the overload condition.

8. The power system of claim 1, wherein deactivating each power module includes sending a deactivation signal to each power module.

9. The power system of claim 8, wherein each power module includes a respective switch configured to control output electrical power, and wherein each power module is configured to deactivate the switch responsive to receiving the deactivation signal.

10. The power system of claim 9, wherein each DC/AC inverter includes the respective switch.

11. The power system of claim 1, wherein each DC/AC inverter is configured to:

draw bus power from the power bus at an active operating voltage;

convert the bus power to the output power; and provide the output power to the output.

12. The power system of claim 11, wherein each power module is configured to control a respective AC/DC converter to maintain the power bus at the active operating voltage level while the respective power module is deactivated.

13. The power system of claim 1, wherein each power module is configured to control a respective DC/AC inverter to be deactivated while the respective power module is deactivated.

14. A power module in a power system which includes a system controller and provides power to a load, the power module comprising:

a module input configured to receive input power;

a module output configured to provide output power to the load;

at least one module sensor configured to provide load information indicative of the output power provided at the module output;

an AC/DC converter coupled to the module input;

a DC/AC inverter coupled to the module output;

a power bus coupled to the AC/DC converter and the DC/AC inverter; and a module controller coupled to the at least one module sensor and configured to:

receive the load information from the at least one module sensor;

determine, based on the load information, that an overload condition exists;

provide, responsive to determining that the overload condition exists and before a determination is made as to a number of activated power modules that is sufficient to address the overload condition, an activation signal to at least one other power module instructing the at least one other power module to provide output power to the load;

determine, after the determination is made as to the number of activated power modules that is sufficient to address the overload condition, that the power module is to be deactivated; and deactivate the power module to discontinue providing the output power to the module output, wherein the module controller is configured to be coupled to a system controller configured to execute the determination is made as to the number of activated power modules that is sufficient to address the overload condition and being coupled to the at least one other power module, and wherein determining that the power module is to be deactivated includes receiving a deactivation signal from the system controller.

15. The power module of claim 14, wherein the module controller is further configured to:
receive an activation signal from the at least one other power module; and
transition from deactive to active responsive to receiving the activation signal from the at least one other power module.

16. The power module of claim 14, wherein the DC/AC inverter includes at least one switching device to control the output power, and wherein deactivating the power module includes deactivating the at least one switch.

17. The power module of claim 14, wherein the DC/AC inverter is configured to:
draw bus power from the power bus at an active operating voltage;
convert the bus power to the output power; and
provide the output power to the output.

18. The power module of claim 17, wherein the module controller is configured to control a respective AC/DC converter to maintain the power bus at the active operating voltage level while the power module is deactivated.

19. A non-transitory computer-readable medium storing thereon sequences of computer-executable instructions for controlling a power module having a module input configured to receive input power, a module output configured to provide power to a load, at least one load sensor configured to provide load information, an AC/DC converter coupled to the module input, a DC/AC inverter coupled to the module output, and a power bus coupled to the AC/DC converter and the DC/AC inverter, the power module being coupled to a system controller coupled to at least one other power module, the sequences of computer-executable instructions including instructions that instruct at least one processor to:
control the power module to provide power to the load;
receive load information from the at least one load sensor;
determine, based on the load information, whether an overload condition exists;
provide, responsive to determining that the overload condition exists and before a determination is made as to a number of activated power modules that is sufficient to address the overload condition, an activation signal to at least one other power module instructing the at least one other power module to provide output power to the load;
determine, after the determination is made as to the number of activated power modules that is sufficient to address the overload condition, that the power module is to be deactivated, wherein determining that the power module is to be deactivated includes receiving a deactivation signal from the system controller, which is configured to execute the determination is made as to the number of activated power modules that is sufficient to address the overload condition; and
deactivate the power module to discontinue providing the output power to the module output.

\* \* \* \* \*